Patented Aug. 3, 1937

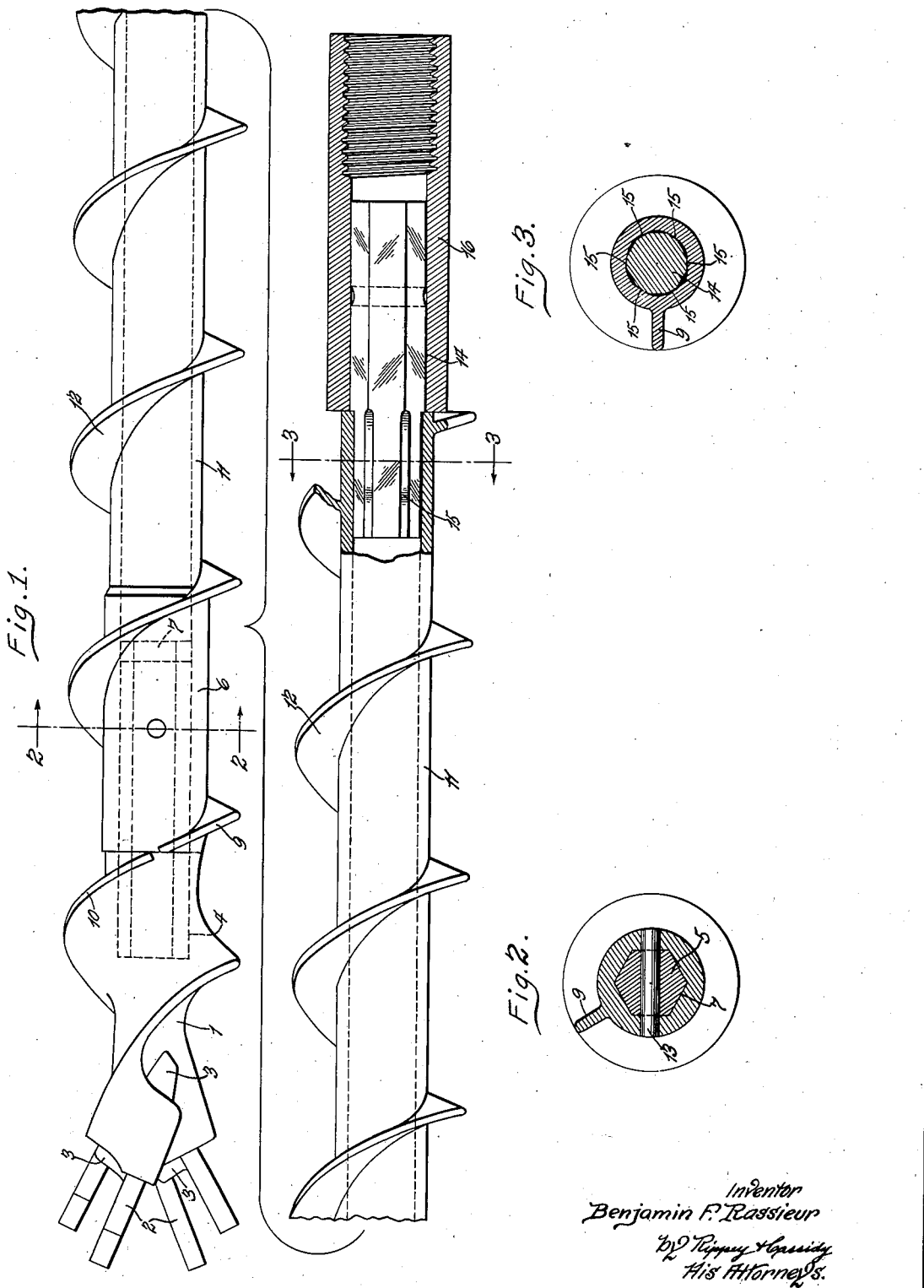

2,088,759

UNITED STATES PATENT OFFICE 2,088,759

MINING DRILL

Benjamin F. Rassieur, Webster Groves, Mo., assignor to Central Mine Equipment Co., St. Louis, Mo., a corporation of Missouri Application February 4, 1937, Serial No. 124,022

11 Claims. (Cl. 255—28)

This invention relates to mining drills, and has special reference to coupling devices for use in attaching the drill head to the auger, and to coupling devices for attaching thread bar sockets to the auger, and for attaching together different auger sections to make up an auger longer than any one of the sections.

Objects of the invention are to provide improved couplings for attaching the drill heads to the augers and having the elements thereof of novel structure and formation so that the couplings may be made of less diameter than those now in use and with which I am familiar, and without sacrificing any of the strength of the couplings; to provide novel couplings composed of elements that may be obtained from manufacturers of standard parts and by use of which the parts are better fitted with closer tolerances than has heretofore been possible without considerable cost beyond the cost of the present invention; to provide an improved coupling for attaching a drill head to an auger that alines the spirals of the drill head with the spirals of the auger and maintains the parts in better alinement than has heretofore been possible by use of square parts extending into the drill head and into the auger coupling; and to provide an improved coupling having an element of novel construction capable of use for attaching sockets to the augers and for attaching together auger sections conveniently and practicably.

Various other objects and advantages of the invention will be readily apparent from the following description, reference being made to the annexed drawing, in which—

Fig. 1 is a broken view showing a mining drill having on one end a coupling to which the drill head is attached and having on the opposite end a thread bar coupling.

Fig. 2 is a cross-sectional view on the line 2—2 of Fig. 1.

Fig. 3 is a cross-sectional view on the line 3—3 of Fig. 1.

The drill head 1 is of the type shown in Patents Nos. 2,010,509 and 2,010,510, granted August 6, 1935, on applications of Walter Cook. The bits 2 are detachably secured to the forward end of the drill head by removable and replaceable wedges 3, as fully disclosed in said patents.

According to the present invention, the outer or opposite end of the drill head is formed with a socket 4 which, in the present instance, is hexagonal in shape so as to receive one end of a hexagonal cold drawn steel coupling member 5. The coupling element 6, as shown, has therein a hexagonal socket 7 in axial alinement with the socket 4 so as to receive the opposite end portion of the coupling member 5 and thereby aline the spiral 9 that is welded on the coupling element 6 with one of the spirals 10 formed on the drill head 1. The opposite end of the coupling element 6 is welded to the inner end of an auger or auger section 11 so that the spiral 9 is in alinement with the spiral 12 on said auger or auger section 11; or the spirals 9 and 12 may be in one continuous part. The socket 7 and the coupling member 5 may be defined respectively as having walls that intersect at angles of more than 90°.

In assembling the parts, the coupling member 5 is inserted into the socket 4 and made rigid therein, as by welding or otherwise. By this arrangement and construction, a very strong coupling is provided with close tolerances and with the coupling element 6 of only slightly greater diameter than the diameter of the auger and of about the same diameter as the adjacent or abutting end of the drill head. Thus, the drillings may flow freely along the drill head and along the coupling and along the auger since the coupling does not choke the hole and prevent the flow of the drillings from the drill head. This is a distinct advantage over the couplings at present in use with which I am familiar and which utilize square coupling members in place of my improved coupling member 5 with its walls intersecting at angles of more than 90° and fitting snugly in a socket of similar shape. Furthermore, by this construction the coupling is stronger than if a square coupling member in the place of the coupling member 5 were used. To obtain the same strength by use of a square coupling member, it is necessary to increase substantially the diameter of the coupling element 6, and that retards and chokes the flow of the drillings. There is no difficulty in forming the parts in this way since tube mills now provide these parts 5 of cold drawn steel.

To hold the coupling member 5 in the coupling element 6, a pin 13 may be driven through alined holes in the coupling element 6 and the coupling member 5. Thus, when the holes are alined and the pin is driven in, one of the drill head spirals 10 is automatically alined with the spiral 9. The drill heads may be detached and others substituted or replaced simply by driving out the pin 13 and withdrawing the coupling member 5 from the coupling element 6.

A coupling member 14 of hexagonal form, or of other form with the walls intersecting at angles of more than 90°, may be attached to the outer end of each auger section 11. The corners 15 are removed by turning or otherwise so as to reduce the diameter of one end portion of the coupling member 14 to the inside diameter of the outer end of the tubular auger section 11. Then the reduced end of the coupling member 14 may be inserted in the tubular end of the auger 11 and made rigid therewith, as by welding, leaving the hexagonal outer end portion of the coupling member 14 extending beyond the auger for engagement in a thread bar socket 16, or with another auger section. Thus, when it is desired to use a longer auger than any auger section, it is possible to couple together two or more sections to make the auger of the length desired.

Due to the close dimensions tolerance of the hexagonal sockets and the hexagonal coupling members, a highly desirable slip fit is obtained in the several connections. This facilitates rapid changing of augers and drill heads to a considerable extent over the coupling devices now in use and with which I am familiar. This is because the usual coupling devices were cast or forged with considerable tolerances so that the fits were either too tight or too loose, and with the result that the parts are difficult to disengage when they are too tight, or that they vibrate and fall out of the sockets when they are too loose. Moreover, the manufacture of these devices is less costly than the manufacture of cast or forged parts.

It should now be apparent that this invention attains all of its intended objects and purposes with a high degree of satisfaction. I do not restrict myself precisely to the use of hexagonal coupling members 5 and 14, since these parts may well be made of different polygonal shapes with more than four sides and advantageous results obtained over the use of the four-sided or square coupling members.

I claim:—

1. A mining drill comprising an auger section, a cylindrical coupling element having one end welded to one end of the auger section and having a socket in its opposite end with walls meeting at angles of more than 90°, a spiral attached to said auger section and to said coupling element, a drill head, and a coupling member rigid with and extending beyond the outer end of said drill head and adapted to slide into and out of said socket in said coupling element and having walls intersecting at angles approximately the same as the angles of the walls of said socket and adapted to fit closely in said socket.

2. A mining drill comprising an auger section having a spiral thereon, a cylindrical coupling element having one end welded to one end of said auger section and having a spiral thereon in alinement with the spiral on the auger section and having a socket therein the walls of which intersect at angles greater than 90° and also having a hole therethrough, a drill head having a spiral thereon adapted to be placed in approximate alinement with said spiral on said coupling element, a coupling member rigid with and extending beyond the rear end of said drill head and having walls intersecting at approximately the same angles as the walls of said socket and being of approximately the same diameter as said socket and adapted to slide into and out of said socket and having a hole therethrough in registration with said hole through said coupling element when the end of said drill head abuts against the end of said coupling element and the spiral on said drill head is in alinement with the spiral on said coupling element, and a pin removably mounted in said holes in said coupling element and said coupling member.

3. A mining drill comprising auger sections, a coupling element attached to one end of each auger section and having a socket therein with walls that intersect at angles of more than 90°, a coupling member attached to and extending beyond the opposite end of each auger section and having walls that intersect at approximately the same angles as the walls of said socket and adapted to slide into and out of said coupling element on another auger section, and means for holding said coupling member in said coupling element to hold the auger sections connected together in alinement.

4. A mining drill comprising auger sections, a coupling element attached to one end of each auger section and having a socket therein with walls that intersect at angles of more than 90°, a coupling member attached to and extending beyond the opposite end of each auger section and having walls that intersect at approximately the same angles as the walls of said socket and adapted to slide into and out of said coupling element on another auger section, means for holding said coupling member in said coupling element to hold the auger sections connected together in alinement, a drill head, a coupling member attached to said drill head and extending beyond the outer end thereof and adapted to fit closely in a coupling element on one of said auger sections, and means for holding said last named coupling member in said coupling element into which it extends.

5. A mining drill comprising an auger section having a socket on one end with walls meeting at angles of more than 90°, a spiral attached to said auger section and extending approximately to the end of said socket, a drill head, and a coupling member rigid with and extending beyond the outer end of said drill head and adapted to slide into and out of said socket and having walls intersecting at angles approximately the same as the angles of the walls of said socket and adapted to fit closely in said socket.

6. A mining drill comprising an auger section having a socket on one end with walls meeting at angles of more than 90°, a spiral attached to said auger section and extending approximately to the end of said socket, a drill head, a coupling member rigid with and extending beyond the outer end of said drill head and adapted to slide into and out of said socket and having walls intersecting at angles approximately the same as the angles of the walls of said socket and adapted to fit closely in said socket, and means for preventing said coupling member from sliding out of said socket.

7. In a mining drill, a drill head, and a coupling member polygonal in cross-section rigid with and extending beyond the outer end of said drill head and adapted to slide into and out of a complementary socket and having relatively smooth unthreaded walls intersecting at angles of more than 90° and approximately the same as the angles of the walls of said socket and adapted to fit closely in said socket.

8. A mining drill comprising auger sections each having a socket on one end provided with walls that intersect at angles of more than 90°, and a coupling member attached to the opposite end of each of said sections and extending beyond the ends thereof and having walls complementary with the walls of said sockets and adapted to slide into and out of said sockets.

9. A mining drill comprising auger sections each having a socket on one end provided with walls that intersect at angles of more than 90°, a coupling member attached to the opposite end of each of said sections and extending beyond the ends thereof and having walls complementary with the walls of said sockets and adapted to slide into and out of said sockets, and means for engaging said sockets and said coupling members to hold them in alined relationship and prevent one section from becoming disengaged from the other.

10. A mining drill comprising an auger section, a coupling member attached to and extending beyond one end of said auger section and provided with walls that intersect at angles of more than 90°, and a thread bar element having a socket therein provided with walls complementary to the walls of said coupling member and adapted to receive and interlock with the walls of said coupling member and thereby prevent relative rotation of said parts.

11. For use in connection with a mining drill having a coupling member attached to one end thereof and provided with walls that intersect at angles of more than 90°, a thread bar element having a socket therein provided with walls complementary to the walls of said coupling member and intersecting at angles of more than 90° and adapted for sliding engagement onto and from said coupling member, whereby rotation of said thread bar element will rotate said mining drill.

BENJAMIN F. RASSIEUR.